Figure 3:
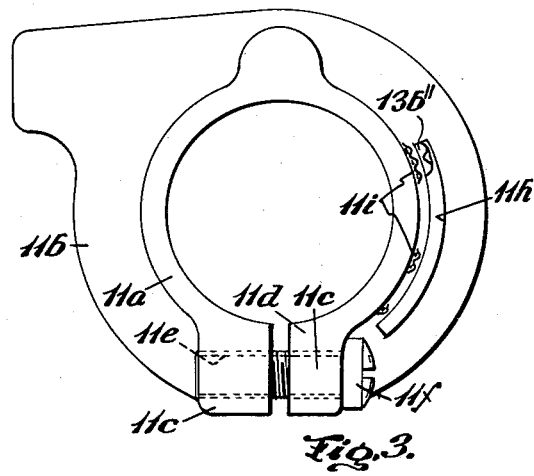

Nov. 23, 1965   R. J. REED   3,218,879
TWIST GRIP CONTROLS
Filed Dec. 3, 1962   2 Sheets-Sheet 1
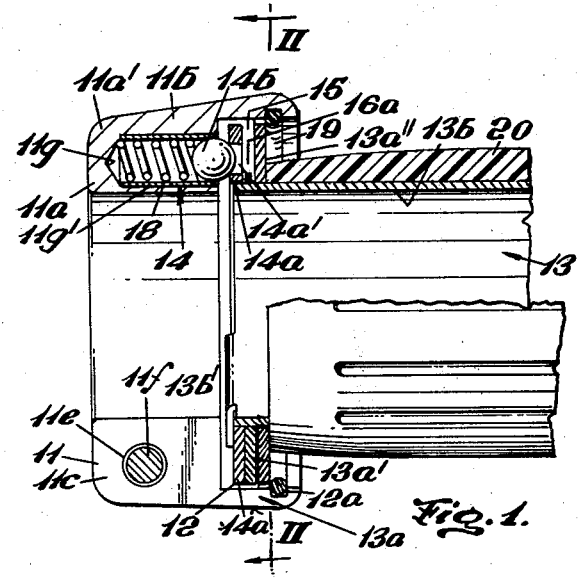
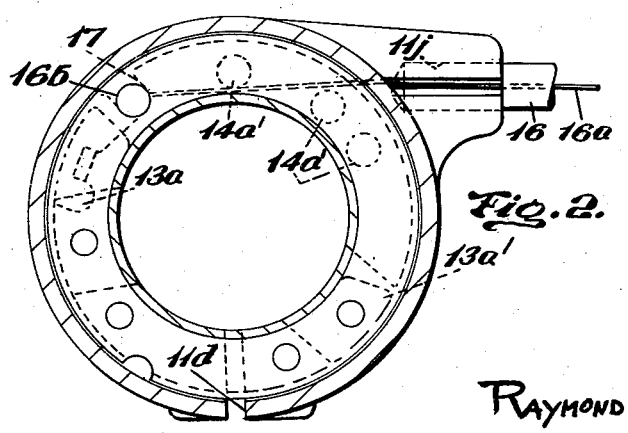
RAYMOND JOHN REED
INVENTOR
BY
Bierman & Bierman Nov. 23, 1965 R. J. REED 3,218,879
TWIST GRIP CONTROLS
Filed Dec. 3, 1962 2 Sheets-Sheet 2

RAYMOND JOHN REED
INVENTOR

BY
Bierman & Bierman

United States Patent Office 3,218,879
Patented Nov. 23, 1965

3,218,879
TWIST GRIP CONTROLS
Raymond John Reed, Nottingham, England, assignor to Raleigh Industries Limited, a company of Great Britain, Northern Ireland, and the Isle of Man
Filed Dec. 3, 1962, Ser. No. 241,765
Claims priority, application Great Britain, Dec. 2, 1961, 43,182/61; July 21, 1962, 28,139/62
4 Claims. (Cl. 74—489)

The invention relates to twist-grip controls and particularly, though not exclusively, concerns such controls as are provided on bicycles for effecting gear change of multi-speed gear assemblies thereof.

Twist-grip controls for bicycle change speed gear assemblies are known which comprise a body part having an integral detent formation and a clamping head adapted to be mounted upon the handlebars of a bicycle, and having a detent member associated therewith adapted to engage, when the parts are assembled, said detent formation, the said body part being disposed coaxially with an end portion of the handlebars and being capable of limited rotational motion about such common axis thus to effect a tensioning and a longitudinal displacement of a cable secured to the detent head. The detent member carried by the clamping head is resiliently loaded in a radial direction to engage one or other of detent formations in said body part.

Such arrangements as are known do, however, possess certain disadvantages.

For example, in the interests of producing a twist-grip control at a competitive price the body part and detent formation are of comparatively soft materials, and although such materials as are used do possess a degree of skin hardness in the finished product, the rate of wear is usually high. A consequence of wear between parts is that the gear selection becomes inaccurate and damage to the multi-speed gear assembly itself may result.

It is among the objects of the present invention to provide an improved twist-grip control which is positive in action, which is reliable, is wear resistant and which is inexpensive in production.

Thus according to the present invention a twist-grip cable control unit comprising a clamping head adapted to be secured to a tube such as a bicycle handlebar with a socket in the head for the cable entry, said head being formed with an end rebate, a control sleeve having its end rotatably located in said rebate, means for retaining the sleeve end in said rebate, and means on the sleeve for receiving the cable and locating it peripherally thereon is characterised in that the end of the sleeve comprises a flange-like assembly of disc-like parts secured to the sleeve, said parts defining between them a peripheral cable location groove.

According to a further feature of the invention the end member, at least, of the flange-like assembly is formed with detent formations and a complementary resiliently loaded detent member is located in the clamping head.

Preferably the detent formations are located in the end face of the end member of the assembly and the detent member is loaded in a direction parallel to the axis of rotation of the sleeve.

In a preferred embodiment of the invention the flange-like assembly of parts includes a detent plate at the outer face of a radial flange to the body, a spacing plate at the reverse face of such flange, and a back plate behind such spacing plate, the elements of said flange-like assembly being secured together and to the said radial flange.

The invention will now be described further by way of example only, with reference to the drawings which illustrate two particular embodiments thereof and in which:

FIG. 1 is a longitudinal section through a twist-grip control unit;
FIG. 2 is a section taken along line II—II of FIG. 1; and
FIG. 3 is a view taken in the direction of the arrow A of FIG. 1.

Referring now to FIGS. 1 to 3 of the drawings, a twist-grip control unit for effecting gear selection of a bicycle three-speed gear assembly comprises a clamping head 11 adapted to be secured in position upon the handlebars of the bicycle and having a rebate 12 at one side thereof, a control sleeve assembly 13 having a flange-like end portion 13a for engagement with the said rebate 12, and co-operating detent means 14 whereby selected relative angular dispositions of the clamping head 11 and the control sleeve assembly 13 may be indicated and maintained.

The clamping head 11 comprises a longitudinally split cylindrical member 11a having a peripheral flange 11b at one end thereof, the said flange 11b having the rebate 12 formed therein. Two lugs 11c are provided, one on each side of the slit 11d in the member 11a, and have aligned holes 11e therein to receive a clamping bolt 11f. The cylindrical member 11a has a thickened wall portion 11a' and such portion 11a' has a blind hole 11g therein directed parallel to the axis of the member 11a; the hole 11g opens into the rebate 12 and a lining 11g' is provided therefor.

An arcuate slot 11h is formed in the flange 11b and the outer surface of the member 11a has suitable legends 11i thereon to indicate predetermined angular positions of the control sleeve assembly relative to the clamping head. A socket 11j is provided in the clamping head and serves to receive the end of the cable sheathing, the wire passing from the socket to the interior of the head through an appropriate channel.

The control sleeve assembly 13 comprises a tubular body part 13b and a flange-like end portion 13a thereto. The body part 13b is conveniently formed from sheet material in conventional manner, and two tags 13b' are provided integral therewith. The tags 13b' are so bent as to be directed radially outwardly of the body part 13b for a purpose yet to become apparent. A pointer 13b'' is also provided and is directed longitudinally of the body part. The flange-like end portion 13a is formed by mounting a disc-like laminate assembly co-axially with the body part 13b and securing such parts to the tags 13b'. The laminate assembly comprises an annular detent plate 14a having three spaced cavities 14a' therein, an arcuate spacing member 13a' in contact with the reverse side of the plate 14a and a back plate 13a'' in contact with the reverse side of the member 13a'. The detent plate 14a is of a hardened material, the spacing member 13a extends over 125° of arc and maintains a gap between plates 14a and 13a'' over the remaining 235° thus to form therewith a wire receiving channel 15 to receive the wire 16a of a cable 16. The detent plate 14a and the back plate 13a'' each have cut-outs 17 therein to receive a nipple 16b at the end of the wire 16a.

The detent means is constituted by the spaced cavities 14a' in the detent plate 14a and a detent member or sphere 14b engaging the lining 11g' in the hole 11g. A spring 18 serves to urge the member 14b into engagement with the cavities 14a' when the unit is assembled. A peripheral groove 12a is formed in the inner surface of the rebate 12 and receives a resilient retaining ring 19 therein.

To assemble the unit, the body part 13b is formed and the tags 13b', constituting a radial flange, bent to assume their intended form. The laminate assembly is applied to the said body part to produce the flange-like end portion 13a and are moved in position so as to abut the rear surface of the tags 13b'. The detent plate 14a is spot-welded to the tags 13b' at two spaced points and the detent plate 14a. The spacing disc 13a' and the back plate 13a" are likewise spot-welded together at two spaced points. A grip 20 is applied to the outer surface of the body part 13a in conventional manner.

The nipple 16b of the cable wire 16a is located in the cut-outs 17 and the said wire is positioned in channel 15. From the channel 15 the wire passes through a threading channel in the clamping head and thence to the socket 11j therein.

The spring 18 is engaged with the hole 11g and the detent member 14b is located at the end of such spring.

By engaging the flange-like end portion 13a in the rebate 12, the detent member 14b is moved into abutment with the surface of the detent member 14a, and such engagement is maintained by positioning the resilient ring 19 in the groove 12a.

The adjustment of the unit and operation thereof is such that the detent member engages the appropriate cavity in the detent plate in correspondence with a correct gear setting, and upon such rotation of the control member as will effect movement of the detent member from one cavity to another cavity so the gear setting is correctly and appropriately adjusted.

Such assemblies as have been described, in addition to being readily applicable to modern production techniques and being comparatively inexpensive in manufacture, do possess certain practical advantages.

For example, the use of a hardened detent plate or a plate manufactured from an inherently hard-wearing material will avoid sloppiness and inaccurate gear selection such as would result from excessive and rapid wear of the co-operating parts of the detent means.

A further advantage lies in the fact that the loading applied to the detent plate by the spring serves to urge the back plate into contact with the retaining ring and thus gives rise to a more satisfactory assembly which is more silent in usage than conventional structures. Manufacturing tolerances in the depth of the rebate in the clamping head and the total thickness of the laminate structure do not combine to give an end product wherein there is appreciable axial play between parts upon assembly, since the spring will automatically move the control sleeve assembly axially until further movement is prevented by the retaining ring.

The invention is not restricted to the particular features of the embodiment hereinbefore described since alternatives will readily present themselves to one skilled in the art. For example, the flange-like assembly of disc-like parts may be formed from other than three elements.

Furthermore, it is to be appreciated that an analogous assembly could be produced for the purpose of adjusting other than a bicycle multi-speed gear assembly.

In this regard it would be possible to produce a vehicle throttle control embodying substantially the same or equivalent features.

What I claim is:

1. A twist grip cable control unit comprising a clamping head adapted to be secured to a tube such as a bicycle handlebar with a socket in the head for the cable entry, said head being formed with an end rebate, a control sleeve having its end rotatably located in said rebate, means for retaining the sleeve end in said rebate and means on the sleeve end for receiving the cable and locating it peripherally thereon characterised in that the end of the sleeve comprises a flange-like assembly of disc-like parts secured to the sleeve body, said parts defining between them a peripheral cable location groove, the flange-like assembly of disc-like parts comprising generally annular members of similar diameters includes a detent plate at the outer face of a radial flange to the body, a spacing plate at the reverse face of such flange, comprising a segment of an annular member, and a back plate behind such spacing plate, the elements of said flange like assembly being secured together and to the said radial flange, the said detent plate being formed with detent formations and a complementary resiliently loaded detent member is located in the clamping head.

2. A twist-grip cable control unit as claimed in claim 1 wherein the detent formations are located in the end face of the end member of the assembly and the detent member is loaded in a direction parallel to the axis of rotation of the sleeve.

3. A twist grip cable control unit as claimed in claim 1 wherein the detent member is loaded in a direction parallel to the axis of rotation of the sleeve.

4. In a twist grip cable control unit consisting of a clamping head adapted to be secured to a tube such as a bicycle handlebar, a socket in said head for cable entry, said head having an end rebate, a control sleeve having an end, said end rotatably mounted in said rebate, means for retaining said sleeve end in said rebate and means on said sleeve for receiving said cable and locating it peripherally thereon, the improvement wherein said sleeve end comprises an outer annular detent plate, an inner annular back plate and a spacing plate between said detent plate and said back plate, said spacing plate being in the form of segment of an annulus, whereby a peripheral cable groove is defined by a substantial circumferential extent of the annulus unoccupied by the segment.

References Cited by the Examiner

FOREIGN PATENTS

| | | |
|---|---|---|
| 2,163 | 1903 | Great Britain. |
| 486,374 | 6/1938 | Great Britain. |
| 635,426 | 4/1950 | Great Britain. |
| 750,478 | 6/1956 | Great Britain. |
| 422,615 | 8/1947 | Italy. |
| 434,602 | 4/1948 | Italy. |

BROUGHTON G. DURHAM, *Primary Examiner.*